United States Patent

[11] 3,588,432

| [72] | Inventor | Roman F. Arnoldy<br>Houston, Tex. |
|---|---|---|
| [21] | Appl. No. | 807,477 |
| [22] | Filed | Feb. 24, 1969 |
| [45] | Patented | June 28, 1971 |
| [73] | Assignee | R.I. Patents, Inc.<br>Houston, Tex. |

[54] STRIP BULKWELDING
5 Claims, 2 Drawing Figs.

[52] U.S. Cl. .................................................. 219/73,
[51] Int. Cl. .................................................. 219/73
[50] Field of Search ...................................... B23k 9/18
                                                    219/73, 76;
                                                    148/26

[56] References Cited
UNITED STATES PATENTS
3,076,888   2/1963   Arnoldy .................... 219/73
3,078,193   2/1963   Jackson ..................... 148/26
3,118,047   1/1964   Johnson ..................... 219/76
3,271,554   9/1966   Johnson ..................... 219/76

*Primary Examiner*—Joseph V. Truhe
*Assistant Examiner*—R.E. O'Neill
*Attorneys*—James F. Weiler, Jefferson D. Giller, William A. Stout, Paul L. Deverter, II, Dudley R. Dobie, Jr. and Henry W. Hope ABSTRACT: The present invention encompasses a method of welding which utilizes a consumable strip electrode having dimensions in the range of approximately 1½ inches in width and from 0.001 to 0.015 inches in thickness, and which electrode is moved parallel to the base metal that is being welded. A layer of granular alloy material is laid on the base metal in order to give a weld having a specific composition with a closely controlled analysis. To achieve an operation having a high capacity with a variety of compositions being available for the weld, the granular material is fed at a granular-to-electrode weight ratio of approximately 1 to 1 to 3 to 1.

PATENTED JUN 28 1971 3,588,432
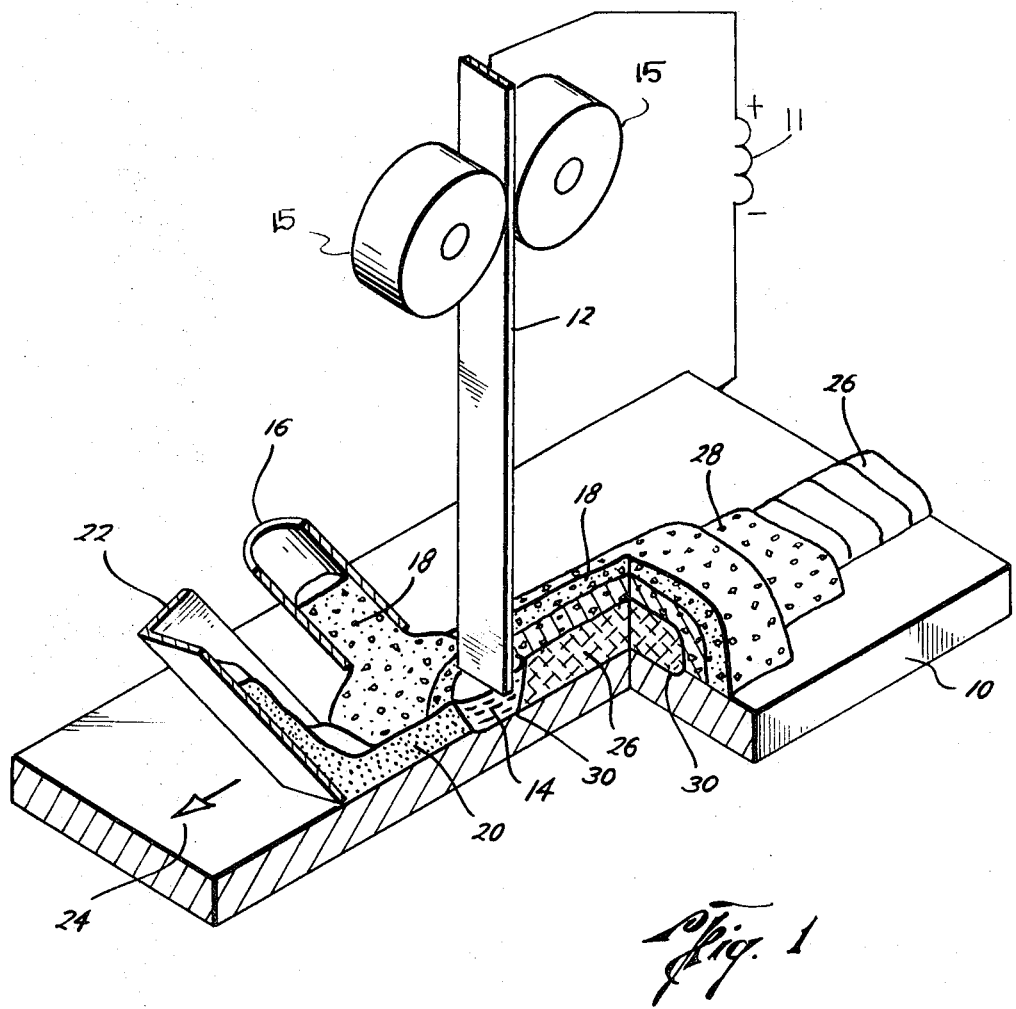
Fig. 1
Fig. 2
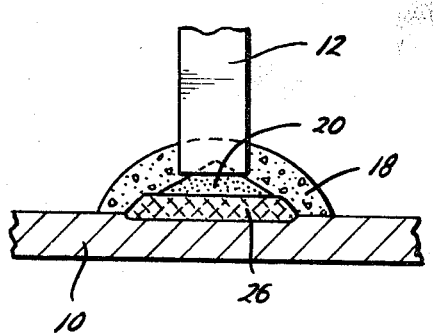
Roman F. Arnoldy
INVENTOR.
BY James F. Weiler
Jefferson D. Giller
Paul L. DeVerter II
Harry W. Hope
ATTORNEYS 3,588,432

STRIP BULKWELDING

CROSS-REFERENCES TO RELATED APPLICATIONS

This invention is related to the welding method set forth in my copending application Ser. No. 801,374, filed on even date herewith, entitled Oscillating Strip Bulkwelding.

BACKGROUND OF THE INVENTION

The field of art to which this invention pertains is electric arc welding, and more particularly, to electric arc welding in which the weld bead is comprised of melted metal from a consumable electrode and from alloy granules.

"Welding" as used herein includes securing pieces of base metal together, cladding, and the like. "Bulkwelding" as used herein means electric arc welding using a consumable electrode and a layer of granular alloy material laid on the base metal. My U.S. Pat. No. 3,076,888, issued Feb. 5, 1963 and entitled "Method of Producing Weld Coatings or Fusion Welds" illustrates several examples of bulkwelding.

Certain problem areas have existed in such bulkwelding. Although satisfactory results are obtainable with these prior methods, it would, of course, be desirable to eliminate such problems. For example, in the process as disclosed in my above-mentioned patent, the intensity of the arc in certain instances is so high as to penetrate through the granular pile and the weld puddle, even though the electrode is oscillated. Accordingly, this arc would contact the base metal, thereby melting excessive amounts of it and diluting the deposited metal. Since one objective sought in bulkwelding is a weld bead having a known specific composition, the excess melting of the base metal is undesirable.

Prior art devices also utilize a strip as a consumable electrode. U.S. Pat. No. 3,271,553, issued to W. C. Johnson on Sept. 6, 1966, discloses such a method. Even with prior art methods and apparatus which utilize strip electrodes there still exist certain disadvantages and shortcomings.

For example, the electrode thickness used in these prior devices requires welding with a light current density and granular-to-electrode ratios of no greater than about 0.25 to 1 for most alloys, and no more than 0.5 to 1 for a few very dense powders. The normal bulkwelding ratios of 2 to 1 to 3 to 1 would cause the pile of deposited alloy granular material to extend too far beyond the width of the strip for any welding with a strip less than 2.25 inches. This would be undesirable due to the fact that a portion of the alloy granules might not be melted or at least uniform melting would not occur. Furthermore, the granular pile would be so deep as to make welding it unfeasible or impossible. In addition, the shrinkage stress in the deposited bead is directly proportional to the bead width. Accordingly, the shrinkage stress would be too large in many instances.

A further disadvantage is found in the fact that the low ratio of granular-to-electrode allows a heavy penetration of the base metal with normal currents. This, again, would ring about a dilution of the weld bead. On the other hand, if light currents are used, the deposition rate will be low compared to the usual bulkwelding rate of deposition. In addition, mixing, as required in making an alloy with bulkwelding, is less efficient under the conditions recited above. Finally, the deposited weld bead tends to be low in the centerline area, thus preventing the uniformity desired in the bead.

SUMMARY OF THE PRESENT INVENTION

The present invention utilizes a strip electrode which is consumable along with the alloy granules. The strip electrode utilized has dimensions of approximately 1½ inches in width with a thickness ranging from approximately 0.001 inches to approximately 0.015 inches. By the use of such a strip, the desired bulkweld ratios in a range of from 1 to 1 to 3 to 1 can be achieved, while insuring a complete and uniform weld throughout.

The use of the above dimensioned strip electrode will allow the high-ratio welding (up to a granular-to-electrode weight ratio of 3 to 1). This gives the wide flexibility desired in the composition of the weld. In addition, this high-ratio welding allows for a low penetration of the base metal by the electrical current, and yet, offers the advantage of providing a high deposition rate, all of this being accomplished by the use of a strip electrode that is smaller than the prior art devices.

The present invention furthermore allows the use of a low intensity arc concentration on the base plate which also brings about a lowered penetration of the base plate by the arc. The present invention allows the use of a naturally shaped granular pile as produced by automated meter feeding equipment which deposits the granules directly on the base. Finally, the efficient and accurate mixing found in bulkwelding is still available with the present method.

It is, therefore, an object of the present invention to utilize a strip electrode with granular deposition bulkwelding.

Still another object of the present invention is to utilize a strip electrode having dimensions of approximately 1½ inches in width by approximately 0.001 to 0.015 inches in thickness, whereby a high ratio of granular to electrode welding may be achieved without excessive granule piles or excessively high currents being required.

Yet another object of the present invention is to provide a welding method with which bulkwelding ratios may be used to allow the making of a weld having a desired composition, and yet which allows for a high deposition rate.

Another object of the present invention is to provide strip electrode bulkwelding which has relatively low penetration of the base plate by the electrode current, whereby there will be little dilution of the weld.

Still another object of the present invention is to provide such a method which will use relatively simple apparatus for the performance thereof, most of the apparatus being previously used prior art apparatus.

Other and further objects, features and advantages will be apparent for the following description of the presently preferred embodiment of the invention, given for the purpose of disclosure, when taking in conjunction with the accompanying drawing.

BRIEF DESCRIPTION OF THE DRAWING

In the attached drawing, like character references designate like parts throughout the several views, which views are as follows:

FIG. 1 is a partial, perspective view, partially in section of a weld being applied pursuant to the present invention, and FIG. 2 is an end view, in section, of a weld that has been applied, as well as material laid on the base plate for a continuation of the weld.

BRIEF DESCRIPTION OF THE PREFERRED EMBODIMENT

Turning now to FIG. 1, the numeral 10 indicates the base plate on which the bulkwelding is to be performed. Element 12 is the strip electrode which is fed toward the base plate 10 by the welding head which is not shown. The electrode 12 is connected to the positive pole of a conventional current source 11, and the plate 10 to the negative pole of the source 11. The weld head apparatus necessary for accomplishing the method of the present invention is well known in the art, and need not be explained in detail here. By way of example, a typical weld head for another form of bulkwelding is shown in my copending application Ser. No. 734,990, filed June 6, 1968, now U.S. Pat. No. 3,517,156, and entitled Welding Apparatus and Method. The electrode strip 12 is fed into the arc zone 14 by rollers 15 carried by the welding head, and its speed is maintained at a constant, predetermined rate.

A tube 16 extends from the welding head, and provides a means for depositing welding flux 18 over the previously deposited alloy granular material 20. This granular material is deposited by a second tubular means 22 which is positioned in front of the tube 16 in relation to the direction of travel of the welding head. This direction of travel is illustrated in FIG. 1 by the arrow 24.

The finished weld bead or overlay is illustrated by the numeral 26. The fused flux 28 is shown overlying a portion of the weld bead 26.

FIG. 2 of the drawing discloses an end view, in section, of the weld bead 26. In this view, the unfused flux 18 and the fused flux 28 have been removed so that only the bead or overlay 26 remains. At the far end of the bead, deposited but unfused granules 20 and flux 18 are shown, again in section. As can be seen, the pile of granular material 20 is in its natural shape as deposited by the tube 22. No special forming of this granular material is required with the present invention. Furthermore, even though the pile of granules extends somewhat beyond the electrode, this is not far enough to prevent the proper formation of the weld bead 26 as in the case of some prior art devices.

In operation, the weld head begins its movement in the direction of the arrow 24. At the same time, it begins depositing the granular material 20 onto the base metal 10 and the flux 18 on top of the granular. Current is applied to the electrode, and an arc is created between the electrode and the pile of granular material, as is more fully explained in my previously mentioned U.S. Pat. No. 3,076,888. In this arc zone, the granular material reaches a molten state, as does part of the flux. A portion of the strip electrode 12 is also consumed by the arc and becomes intermixed with the alloy granules 20.

In addition, at least a small portion of the base metal 10 is melted as at 30. This small amount of melting of the base metal is desirable in that it provides for a more secure bonding of the weld bead 26 to the base metal 10. It is only the excessive melting of the base 10 that is objectionable, which excessive melting is caused by the use of a too small granular-to-electrode ratio of material, or the use of a current that is too large.

Following the formation of the weld, the unfused flux is removed by brushing it from the overlay and fused flux. Then the fused flux is chipped off. This is, of course, a process well known in the art, and no further explanation need be given here.

As is recognized by the present invention, however, by the proper proportioning of the electrode strip 12, the desired granular-to-electrode ratio used in bulkwelding can be achieved without the drawbacks mentioned previously. In addition, increased deposition is obtained—but with the use of a generally smaller electrode. The use of a strip having a thickness ranging from approximately 0.001 inches to approximately 0.015 inches will allow the use of the proper proportions of granular material 20 without the problems of having too much granular for the electrode, having too great a pile, or requiring too large a current for the electrode. Accordingly, the mixing as required in making an allow in bulkwelding may be achieved, and granular piles as naturally shaped when fed through a tube such as 22 may be employed. No special shaping of the granules is required, and a low intensity arc concentration on the base plate results. Thus, there is lowered penetration of the base plate with less dilution of the weld bead.

By way of illustration of the improved results obtained by the invention disclosed herein, two examples will be given of welding with the method disclosed herein and a prior art strip method similar to that in the Johnson patent cited previously. Example I below will be the prior art method; and Example II will give the results of a welding operation with the process as disclosed herein.

EXAMPLE I

The strip used with this prior-art-type method measured 2.0 inches in width by 0.030 inches in thickness. The following conditions were present:

| | |
|---|---|
| Amperage | 1,000 amps. |
| Voltage from electrode to granular pile | 30 volts. |
| Rate of travel of welding head | 11 inches/min. |
| Granular-to-electrode ratio | .25-to-1. |
| Thickness of granular deposition | 3/16 inches. |
| Deposition rate | 36 pounds/hour. |
| Deposition rate per 100 amps | 3.6 pounds/hour. |

EXAMPLE II

By way of comparison, a typical set of conditions of the apparatus as operated in accordance with the present invention and using an electrode strip measuring 1.5 inches in width by 0.005 inches in thickness gives the following results:

| | |
|---|---|
| Amperage | 500 amps. |
| Voltage | 30 volts. |
| Rate of travel | 11 inches/min. |
| Granular-to-electrode ratio | 2-to-1. |
| Thickness of deposition | 3/16 inches. |
| Deposition rate | 45 pounds/hour. |
| Deposition rate per 100 amps | 9 pounds/hour. |

As can be seen from a comparison of example I and example II, the bulkwelding as performed in accordance with the present invention gives a number of advantages over the prior art welding operation. For example, the current used is one-half that required in the prior art process. The granular-to-electrode ratio that may be used with example II provides for a much wider range in the proportion of alloy granulars used in the weld bead. In fact, this granular-to-electrode ratio may be varied within the range of from 1 to 1 up to 3 to 1 . As has been previously pointed out, this provides for the ratios desired for bulkwelding and for better and more efficient mixing with a wider variety of compositions obtainable in the weld bead.

The same thickness of deposit has been used as in the prior art process, but the deposition rate with the present invention is 25 percent higher, and the rate of deposit per 100 amps is 2½ times that of the prior art process.

As can be seen from the above discussion, therefore, substantial advantages are achieved with the use of the invention as described herein. The above-mentioned advantages are achieved in spite of the fact that a significantly smaller strip electrode is employed in the present invention, as compared to the above discussed prior art process. In spite of this fact, improved results and increased capacity and flexibility are obtained.

As can be seen from the foregoing, the objectives set forth at the outset have been accomplished herein. A method has been disclosed of bulkwelding with a strip electrode that provides for increased deposition rates at the ratios of granular-to-electrode desired in bulkwelding, yet which accomplished this with a smaller, rather than a larger, strip electrode. In addition, a lower current is used which provides for lowered penetration of the base metal with decreased dilution of the weld bead. The deposited weld bead is uniform throughout, and the shrinkage stress therein is decreased. No special apparatus or formation of the deposited granular material is required, the present invention using naturally shaped granular power as deposited by the welding head. In addition, presently known welding apparatus may be utilized in employing the present invention and to achieve the improved results accomplished by it.

The present invention is, therefore, well adapted to carry out the objects and attain the ends and advantages mentioned, as well as other inherent therein.

I claim:

1. A method of welding at least a portion of a metal surface with a welding head utilized to create a welding arc, including the steps of:

moving a consumable electrode strip having a thickness of substantially 0.015 inches and less into the arc zone of the welding head in a controlled manner, depositing alloy granules in said arc zone at a granular-to-electrode weight ratio of (approximately) substantially 1 to 1 to 3 to 1, and moving the welding head only parallel to said portion at a controlled rate of travel.

2. The invention of claim 1 wherein the electrode strip moving step is further defined as:

moving a consumable electrode strip of substantially 1.5 inches in width by substantially 0.005 inches in thickness into said arc zone in said controlled manner.

3. The invention of claim 1 wherein the electrode strip moving step is further defined as:

moving a consumable electrode strip having a width of substantially 1.5 inches and a thickness of substantially 0.001 to 0.015 inches into the arc zone in said controlled manner.

4. The invention of claim 1 wherein said depositing and electrode strip moving steps are further defined as:

moving a consumable electrode strip having a width of substantially 1.5 inches and a thickness of substantially 0.005 inches, and depositing alloy granules in said arc zone at a granular-to-electrode weight ratio of approximately 2 to 1.

5. A method of welding a metal surface with a welding head utilized to produce a welding arc, including the steps of:

moving the welding head parallel to said surface at a controlled rate of travel, moving a consumable electrode strip having a width of substantially 1.5 inches and a thickness of substantially 0.005 inches into the arc zone of the welding head, and depositing alloy granules in said arc zone at a granular-to-electrode weight ratio of substantially 2 to 1.

UNITED STATES PATENT OFFICE
CERTIFICATE OF CORRECTION

Patent No. 3,588,432    Dated June 28, 1971

Inventor(s) Roman F. Arnoldy

It is certified that error appears in the above-identified patent and that said Letters Patent are hereby corrected as shown below:

Column 1, Line 55, cancel "ring" and insert therefor -- bring --.

Column 4, Line 74, cancel "(approximately)".

Signed and sealed this 1st day of August 1972.

(SEAL)
Attest:

EDWARD M. FLETCHER, JR.          ROBERT GOTTSCHALK
Attesting Officer                Commissioner of Patents